Patented July 15, 1930

1,770,402

UNITED STATES PATENT OFFICE

ROBERT HAMBURGER AND STEFAN KAESZ, OF FREUDENTHAL, CZECHOSLOVAKIA, ASSIGNORS, BY MESNE ASSIGNMENTS, TO STANDARD BRANDS INCORPORATED, OF DOVER, DELAWARE, A CORPORATION OF DELAWARE

METHOD OF TREATING MOLASSES

No Drawing. Application filed October 12, 1923, Serial No. 668,193, and in Czechoslovakia and Germany December 23, 1922.

This invention relates to the preliminary treatment of beet molasses to render it suitable for use in the manufacture of yeast.

Although a relatively clear molasses is obtained in the known processes for purifying molasses for the production of yeast, this does not prevent baker's yeast produced from such molasses from frequently being discoloured and of little stability.

The present process pertains to a preliminary treatment of beet molasses by which its utility for the production of yeast is increased to an extraordinary degree and also produces the desired results with those kinds of molasses with which the hitherto known methods failed completely, particularly with molasses produced from cane sugar.

According to the invention a colloidal system of, for example, a precipitate of oxyhydrates with a high degree of dispersion is produced in the molasses itself and the degree of dispersion and hydration of this precipitate is gradually diminished, either by prolonged heating or by the addition of coagulatable substances, or of substances which by chemical transformation produce a coarser precipitate containing less water, or finally by the combination of these two measures. After the precipitate has settled it is removed from the molasses in a known manner, for example by decantation, filtration, or centrifuging.

These precipitates are best produced in the solution of the molasses to be clarified, for example by the addition of alkali silicate to the acidulated solution, or by the addition of aluminum salts, (such as aluminum sulphate) and ammonia. For example lime, baryta, strontia, magnesium oxide or hydroxide, aluminum oxide or hydroxide, or the like, may be used as additions which promote the transition of the colloidal precipitates into coarsely disperse systems, said substances being preferably added in slightly larger amounts than those equivalent to the amount of the precipitated hydroxide. Compounds such as for example calcium silicates or calcium aluminates are thus formed.

The following examples serve to illustrate the invention:

1. Beet molasses is diluted to about 18° Bg., acidulated to a degree of acidity of about 1.2° to 1.4°, the degrees being calculated as the number of cc. of normal caustic soda required to neutralize 100 cc. of the solution, using litmus as an indicator. The mixture is then moderately heated, and a solution of an alkali silicate, such as sodium silicate, is added thereto in quantities depending upon the composition of the molasses. In order to secure ease of admixture with the molasses and a satisfactory clarifying action, we have found it preferable to add the silicate in approximately double-normal strength, which theoretically contains about 212.4 grams of dry sodium silicate per liter. The amount of such double-normal alkali silicate solution which should be used varies in accordance with the composition and ease of clarification of the molasses from about 695 cc. to 1215 cc. per 100 kilograms of molasses, it being necessary to add only such an amount as will give a coarsely flocculent precipitate, which settles easily upon heating the mixture for a short time. After complete clarification the clear solution of molasses is withdrawn and may be used in the manufacture of baker's yeast by any desired method.

2. Beet molasses is diluted to about 18° Bg., heated and treated in an approximately neutral state with about 1% of aluminum sulfate, although the exact amount may vary somewhat in accordance with the composition of the molasses. An amount of aqua-ammonia is thereupon added which is in stoichiometric relation to the quantity of aluminum sulfate employed, whereby a transposition in accordance with approximately the following equation can occur:

$$Al_2(SO_4)_3 + 6NH_3 + 6H_2O = 3(NH_4)_2SO_4 + 2Al(OH)_3.$$

In practice, about 250 kilograms of molasses is neutralized with 170 cc. of sulfuric acid (60° Bé.) and about 2½ kilograms of aluminum sulfate added, whereupon the mixture is heated. There is then added about 880 cc. of aqua-ammonia ($NH_3$ content 25%).

The mixture is then heated, the precipitate allowed to settle, and the clear solution of molasses drawn off and used as specified in Example 1.

3. Molasses may be treated in accordance with either Examples 1 or 2, and after the production of a flocculent precipitate a sufficient amount of lime is added, which we have found increases the extent and efficiency of the precipitation. In Example 1, for instance, about 290 grams of unslaked lime may be employed for each 100 kilograms of molasses, and in Example 2 about 200 grams of lime will be sufficient.

Molasses, purified and clarified, according to the present invention can be afterwards made acid or alkaline to any desired extent without it becoming turbid again.

For the purpose of purifying water it is already known to produce voluminous precipitates which free the water of suspended impurities on precipitation, either only a coagulatable substance is precipitated which takes with it the micro-organism in a similar way as a net or the precipitates are used for blocking the pores of the filter. However, in all these processes at a lower temperature the voluminous precipitate has only a more or less mechanical action. The purification of molasses, however, presents a peculiar colloidal chemical problem, by reason of the fact that possibly the sugar is adsorbed by non-colloidal substances of a non-sugar character. For this reason also the proposal of clarifying molasses with albumin or gelatine or of adding aluminium hydrate under such conditions that the albumin constituents are not attacked, could not lead to the desired result, so that in substitution thereof it has been recommended to treat dilute molasses with alum at 70° C., according to German Patent 108,334, for the purpose of deodorizing same, and for precipitating albumins and organic impurities with simultaneous inversion of the sugar, and to remove the excess of alum from the molasses by lime, that is to effect the purification chemically, as this has also been attempted by other means. In contradistinction to this known proposal, the present invention is based on colloidal chemical considerations. The result of the alterations of the condition of the colloidal precipitates, for the purpose of gradually reducing the degree of dispersion up to the production of coarser-dispersed systems, which alterations are favoured by the molasses being rich in salts is by no means only to cause these precipitates to be more easily and completely separated but is in the first place to break off the sugar adsorption compounds.

It is also known to purify beet-juice and molasses for the production of sugar, by voluminous precipitates of oxy-hydrates, by adding to these raw materials, silica hydrate or colloidal alumina, whilst heating, or by separating silica hydrate from water-glass by the addition of acids. In the purification of raw juices with colloidal alumina it has also been recognized as advantageous to heat the mixture slowly to 60-70° C. Moreover for the purpose of obtaining a lime sugar solution it has been proposed to add very small amounts of lime during the heating or after a short heating of beet-juices with silica hydrate, or with colloidal alumina. However, it could not have been foreseen that such a far-reaching improvement in the suitability of molasses for the production of yeast could be obtained by applying the present measures. Moreover the systematic production of the alterations of the colloidal condition of the highly dispersed system produced in the molasses itself constitutes a considerable difference for the desired purpose, as compared with the apparently similar processes of the sugar industry.

We wish it to be understood that we do not desire to be limited to the exact details as described, for obvious modifications will occur to a person skilled in the art.

Having described our invention, what we claim as new and desire to secure by Letters Patent is:—

1. A method of preliminary treatment of beet molasses to render it suitable for use in the manufacture of yeast, which comprises acidulating a diluted solution of the molasses, heating the same, adding alkai silicate, and, after the formation of a flocculent precipitate, adding substances which produce a coarser precipitate containing less water, allowing the precipitate to settle, and drawing off the clear solution.

2. A method of preliminary treatment of beet molasses to render it suitable for use in the manufacture of yeast, which comprises acidulating a diluted solution of the molasses, heating the same, adding alkali silicate, and, after the formation of a flocculent precipitate of silica hydroxide, adding lime, allowing the precipitate to settle, and drawing off the clear solution.

3. In the art of yeast manufacture, the steps in the preparation of a yeast nutrient solution which comprises diluting molasses to about 18° Balling, acidulating the solution to a degree of acidity of about 1.2° to 1.4° per 100 cc. of the mixture, heating the same, adding a double-normal alkali silicate solution, mixing the mass intimately, adding substances which produce a coarser precipitate containing less water, while maintaining the mass in a heated condition, allowing the precipitate to settle, and drawing off the clear solution, the said substances which produce a coarser precipitate being added in amounts larger than those equivalent to the amount of the precipitated silica hydrate.

4. In the art of yeast manufacture, the steps in the preparation of a yeast nutrient solution which comprise diluting molasses to about 18° Balling, acidulating the solution to a degree of acidity of about 1.2° to 1.4° per 100 cc. of the mixture, heating the same, adding a double-normal alkali silicate solution, mixing the mass intimately, adding lime, while maintaining the mass in a heated condition, allowing the precipitate to settle, and drawing off the clear solution, the lime being added in amounts larger than those equivalent to the amount of the precipitated silica hydrate.

In testimony whereof we have affixed our signatures.

ROBERT HAMBURGER.
STEFAN KAESZ.

CERTIFICATE OF CORRECTION.

Patent No. 1,770,402.   Granted July 15, 1930, to

ROBERT HAMBURGER ET AL.

It is hereby certified that error appears in the printed specification of the above numbered patent requiring correction as follows: Page 2, line 98, claim 1, for the misspelled word "alkai" read alkali; same page, line 115, claim 3, and page 3, line 2, claim 4, before the word "molasses" insert the word beet; and that the said Letters Patent should be read with these corrections therein that the same may conform to the record of the case in the Patent Office.

Signed and sealed this 21st day of October, A. D. 1930.

M. J. Moore,
Acting Commissioner of Patents.

(Seal)

tion which comprise diluting molasses to about 18° Balling, acidulating the solution to a degree of acidity of about 1.2° to 1.4° per 100 cc. of the mixture, heating the same, adding a double-normal alkali silicate solution, mixing the mass intimately, adding lime, while maintaining the mass in a heated condition, allowing the precipitate to settle, and drawing off the clear solution, the lime being added in amounts larger than those equivalent to the amount of the precipitated silica hydrate.

In testimony whereof we have affixed our signatures.

ROBERT HAMBURGER.
STEFAN KAESZ.

CERTIFICATE OF CORRECTION.

Patent No. 1,770,402.    Granted July 15, 1930, to

ROBERT HAMBURGER ET AL.

It is hereby certified that error appears in the printed specification of the above numbered patent requiring correction as follows: Page 2, line 98, claim 1, for the misspelled word "alkai" read alkali; same page, line 115, claim 3, and page 3, line 2, claim 4, before the word "molasses" insert the word beet; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.